United States Patent [19]

Lee

[11] Patent Number: 5,050,222

[45] Date of Patent: Sep. 17, 1991

[54] POLYGON-BASED TECHNIQUE FOR THE AUTOMATIC CLASSIFICATION OF TEXT AND GRAPHICS COMPONENTS FROM DIGITIZED PAPER-BASED FORMS

[75] Inventor: Yongchun Lee, Rochester, N.Y.

[73] Assignee: Eastman Kodak Company, Rochester, N.Y.

[21] Appl. No.: 526,928

[22] Filed: May 21, 1990

[51] Int. Cl.$^5$ .............................................. G06K 9/48
[52] U.S. Cl. ...................................... 382/21; 382/22; 382/38; 358/462
[58] Field of Search ................... 382/21, 22, 25, 36, 382/38; 358/462, 464

[56] References Cited

U.S. PATENT DOCUMENTS

| | | |
|---|---|---|
| 3,805,237 | 4/1974 | Cobb et al. |
| 4,183,013 | 1/1980 | Agrawara et al. |
| 4,292,622 | 9/1981 | Hendrichon, Jr. |
| 4,428,077 | 1/1984 | Shimada et al. ............. 382/9 |
| 4,435,836 | 3/1984 | Rubin ......................... 382/27 |
| 4,633,502 | 12/1986 | Namba ......................... 382/9 |
| 4,668,995 | 5/1987 | Chen et al. ................. 358/282 |
| 4,718,103 | 1/1988 | Shojima et al. ............. 382/13 |
| 4,736,442 | 4/1988 | Kornfeld ...................... 382/44 |
| 4,741,046 | 4/1988 | Matsunawa et al. ......... 382/9 |
| 4,783,829 | 11/1988 | Miyakawa et al. .......... 382/25 |
| 4,862,283 | 8/1989 | Smith ......................... 358/464 |

Primary Examiner—David K. Moore
Assistant Examiner—Yon Jung
Attorney, Agent, or Firm—Dennis R. Arndt

[57] ABSTRACT

A polygon-based graphics/text separation method is comprised of two sequential processes. First a raster to contour vector conversion step is used to convert a digitized bitmap into a collection of simple polygons. Next a component classification process is used to extract six particularly defined features of each of the individual polygon-based components to enable the separation of graphics and text polygons. Graphical polygons are further classified into four subclasses. Textual polygons are grouped into polygon strings (text strings). Each string contains a sequence of segmented character contour polygons which is ready for an optical character recognition algorithm to convert them into computer understandable ASCII characters.

3 Claims, 15 Drawing Sheets

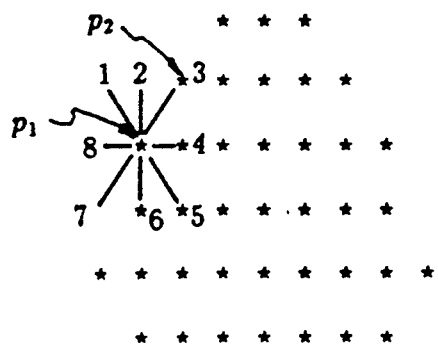
\* = black pixels
FIG. IA
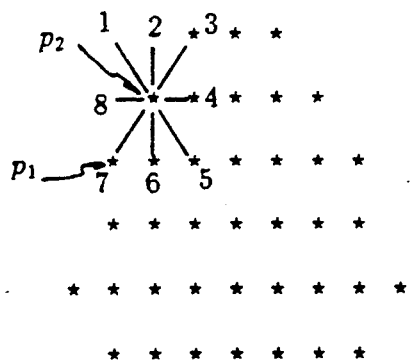
FIG. IB
| 1 | 2 | 3 |
|---|---|---|
| 8 | * | 4 |
| 7 | 6 | 5 |
FIG. IC

| | | | | | PAGE OF |
|---|---|---|---|---|---|
| ENGINEERING CHANGE REQUEST PROCEDURE #4-01-0 | | | | | ECN |
| | | | | | ECR LOG |

| PART NO. | REV. | PART NAME | PROD. CODE | PLANT LOG |
|---|---|---|---|---|
| CONFIGURED ASSY. NO. | | PROD. NO. | PROD. NAME | |

DESCRIPTION OF CHANGE

REASON FOR CHANGE:

PRINTS RED-LINED FOR PRODUCTION

BY    QUANTITY    DATE

OPERATION CHANGE

| MARKED UP PRINTS ATTACHED ☐ QTY. | REQUESTED BY: | DEPT. | DATE |
|---|---|---|---|

COMMENTS:

CATEGORY OF CHANGE (BY EC BOARD)

☐ PRIORITY

CLASS
- A ☐ NEW
- B ☐ REV
- C ☐ VOID
- D ☐ INACTIVE
- E ☐ OBSOLETE

RECOMMENDED DISPOSITION OF PARTS

| | ALL | ON ORDER | | | IN PROCESS | IN STOCK | | IN FIELD | FIELD RETURN |
|---|---|---|---|---|---|---|---|---|---|
| | | USER PLT. | MFG PLT. | VEND | USER PLT. | USER PLT. | WHS | | |
| | | A | B | C | D | E | F | G | H |
| 1 SCRAP | | | | | | | | | |
| 2 REWORK | | | | | | | | | |
| 3 USE UP | | | | | | | | | |
| 4 BALANCE | | | | | | | | | |
| 7 NO CHNG | | | | | | | | | |
| 8 ADDN | | | | | | | | | |

REQUIRES:
- ECA ☐
- CONFIGURATION CONTROL ☐
- ECN APPROVAL ☐

AFFECTS:
- OEM ☐
- SPECIFICATIONS ☐
- TEST EQUIPMENT ☐
- SOFTWARE ☐
- TOOLING ☐
- SERVICE ☐
- INSTALLATION ☐
- INTERCHANGEABILITY ☐
- UL PROCEDURES ☐

DISAPPROVED ☐
REASON IN COMMENTS BOX

APPROVED ☐
E C BOARD CHAIRMAN

APPROVALS

| ENGINEERING | QUALITY | MANUFACTURING | SOFTWARE | PRODUCT MANAGEMENT | RESPONSIBLE ENGINEER |
|---|---|---|---|---|---|
| ENGINEERING MANAGEMENT | SERVICE | MATERIAL CONTROL | UL | ACCOUNTING | |

POLYGON-BASED TECHNIQUE FOR THE AUTOMATIC CLASSIFICATION OF TEXT AND GRAPHICS COMPONENTS FROM DIGITIZED PAPER-BASED FORMS

CROSS REFERENCE TO RELATED APPLICATIONS

Reference is made to commonly-assigned, copending U.S. Pat. application Ser. No. 526,426, entitled "A Method Of Detecting Skew In Form Images", and U.S. Pat. application Ser. No. 526,425, entitled "A Polygon-Based Method For Automatic Extraction Of Selected Text In A Digitized Document", each filed in the name of Yongchun Lee and filed concurrently herewith.

TECHNICAL FIELD OF THE INVENTION

The present invention relates to image processing techniques in general and more particularly, to the automated separation of graphics and text in a digitized paper based form.

BACKGROUND OF THE INVENTION

A typical paper form used in an office environment consists of characters, symbols, lines, and charts while characters are denoted as text components. The conversion from a paper form into an editable electronic form is an essential function in automated office environments. To achieve the function requires a computer-based system which is capable of performing: (a) automatic separation of text and graphics components in a digitized document; (b) recognition of symbols and structures of charts; (c) automatic data organization to preserve spatial relations of graphical components and text strings. In addition, an optical character recognition system is required to convert text strings into ASCII strings, and a user interface tool incorporated with a database is a necessity for form editing and creation.

Runlength smearing, projection and connected component analysis are three techniques for component classification in a document. The runlength smearing method operates on the bitmap image such that any two black pixels (1's) which are less than a certain threshold apart are merged into a continuous stream of dark pixels. White pixels (0's) are left unchanged. It is first applied row-by-row and then column-by-column by applying a logical AND to each pixel location. The resulting image contains a smear wherever printed materials appear on the original image. The graphics and text discrimination of the smear regions is made by classification of features extracted from the smear regions. Apparently, smearing fails if a document is skewed, and the smear region features are not suitable for graphics/text separation because they are alike in both a text region and a dense region of graphics.

The projection method uses recursive projection profile cuts to decompose a document into a set of blocks. At each step of the recursive process, the projection profile is computed along both horizontal and vertical directions; a projection along a line parallel to, for example, the X-axis, is simply a sum of all the pixel values along that line. Then, subdivision along the two directions is accomplished by making a cut corresponding to deep valleys, with widths larger than a predetermined threshold, in the projection profile. The block classification requires feature extraction from each block and heuristic thresholds to classify text line blocks, graphics blocks and halftone blocks. This method does not work well with skewed documents and requires intensive computation for further extraction of image information within the blocks.

The connected component analysis method first determines the individual-connected components which contain individual character and other large figures. Possible features for performing component classification are size, geometrical branching structure and shape measures. The disadvantages associated with this technique are large processing memory, long computational times and inefficiency of data structure for post processing.

In addition to the three techniques mentioned above, there are three additional shortcomings encountered when using any bitmap based technique. First, a large memory is required in the process of classification. Secondly, low degrees of precision are achieved since the method lacks any geometrical information for component classification; and thirdly, each classified component is simply a collection of connected pixels, which is an inefficient data structure for post recognition processing. For these reasons, the classification results produced by bitmap methods are not desirable and high-speed and relatively high-precision applications such as those dealing with forms conversion and creation.

A typical paper form used in an office environment consists of characters, symbols, lines, charts and bit-reversed regions. Characters are denoted as a text component. Symbols, lines, charts and light texts (bit-reverse) are usually defined as graphic components. The conversion from a paper form into an editable electronic form is an essential function in the automated office environment. To achieve this function, requires a computer-based system which is capable of performing (a) automatic separation of text in graphic components in a digitized document; (b) recognition of symbols and structures of charts; and (c) automatic data organization to preserve spatial relations of graphic entities and text strings. In addition, an optical character recognition system is required to convert text strings into ASCII strings and a user interface incorporated with a data base is necessary for form editing and creation.

Much of the research that has been performed to automate document analysis systems has been in relation to engineering drawings and diagrams. A major barrier to building a practical system is the lack of a fast and reliable algorithm for graphics/text separation and for providing an efficient data structure for post graphics decomposition and recognition.

DISCLOSURE OF THE INVENTION

The present invention is directed to a polygon-based method for the automatic classification of text and graphic components in a shorter period of time with the utilization of less memory. The method is comprised of two processes. First, a raster-to-contour vector conversion process is used to convert the digitized bitmap image into a collection of simple polygons. This conversion is accomplished by tracing each object's boundary contour (borderline between black and light pixels) to collect contour pixels, and then a linear approximation technique is applied to each individual contour for the extraction of a polygon by emerging colinear pixels. Secondly, a component classification process takes place which extracts the features of each of the individual polygon-based components allowing for the separation of graphics and text.

BRIEF DESCRIPTION OF THE DRAWINGS

FIGS. 1A-C show a pixel neighborhood and the pixel search order;

Figure 8B:
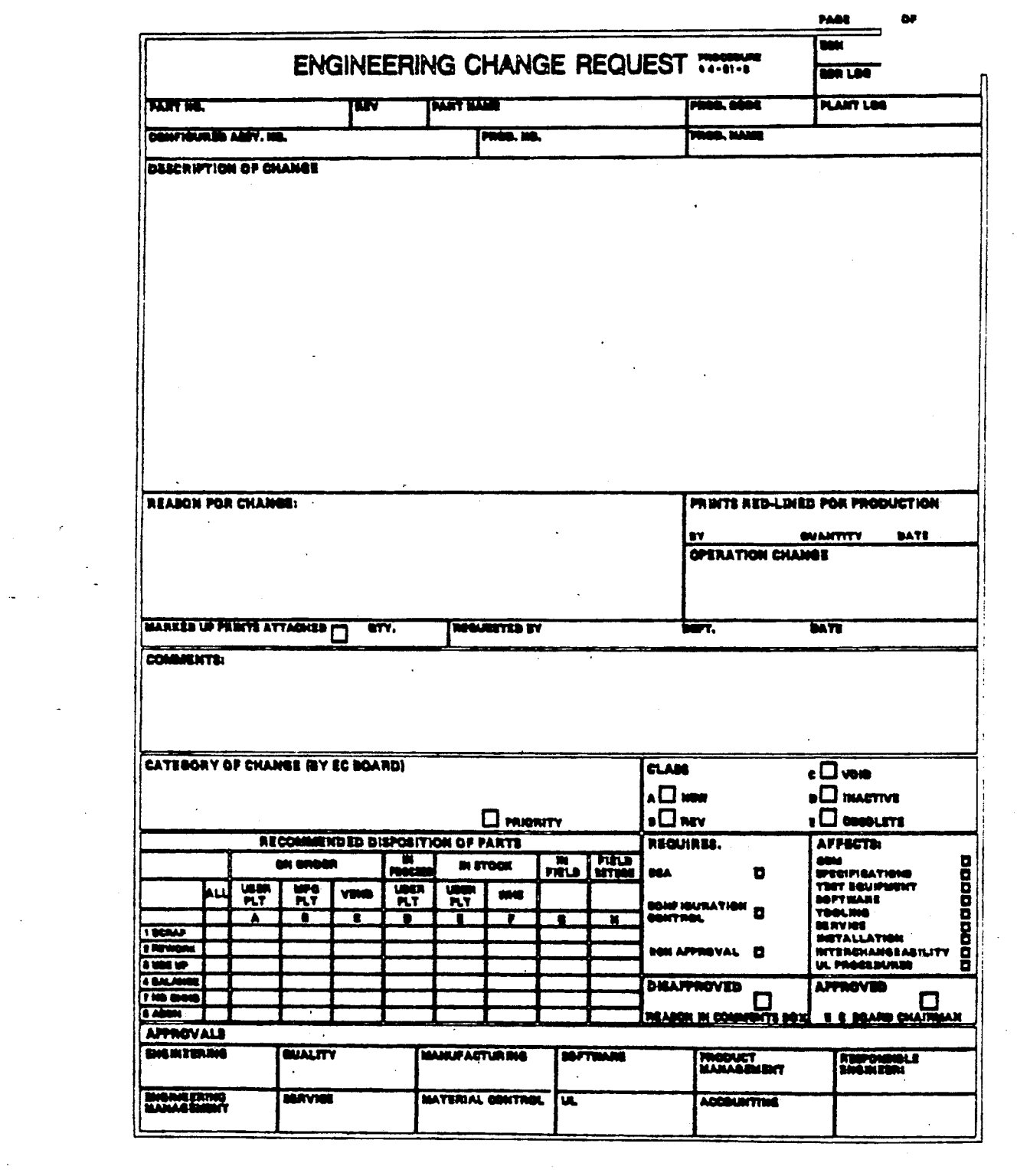

FIGS. 8A and 8B illustrate the original document and the vectorized document respectively;

MODES OF CARRYING OUT THE INVENTION

The present invention uses a polygon-based method which overcomes many of the limitations associated with bitmap techniques mentioned earlier to provide a highly accurate classification of text and graphics components.

Contour vectorization is the first in several steps needed to achieve classification of text and graphics components. Contour vectorization converts a digitized document into a collection of polygons. This conversion requires contour pixel tracing followed by piecewise linear approximation of the contour pixels.

The contour pixel tracing operation starts by scanning pixels in a horizontal direction. Whenever a transition from 0 to 1 is detected, it traces the contour in a rotational order until it returns to the starting point for the completion of a contour. The rotational order that the search is performed is illustrated in FIG. 1. The pixel $p_1$, is a transition which is detected by scanning the document page from left to right. Using a three by three grid shown in FIG. 1C with the center pixel being $p_1$ the first transition and looking in the specified search order 1-8 of FIG. 1C until the next transition is located. In this instance, $p_2$ was located in cell number 3 of the three by three grid. That pixel was located using the rule of adding a value of four to the previous direction using module 8 arithmetic, and adding one to the result. $p_2$ in FIG. 1B is now the central pixel in the three by three grid in the same search order thus locating the transition in cell 3. The next pixel in the search starting from pixel $p_2$ in direction 8. The process is repeated until a closed contour is completed. After completion of a contour tracing, scanning resumes to find the next transition and then traces the next contour. This process is repeated until the last contour has been completed. The contour tracing process provides two major advantages, contour isolation and data compression, for later graphics/text classification, because the resulting collection of contours requires less memory for data storage and only the contour of the black areas are stored. According to the contour tracing rule, an outer contour goes clockwise and an inner contour is in a counterclockwise direction. The contour orientation is embedded in the sequence of the contour pixels. It is a useful feature for discrimination between outer and inner contours of polygons.

Piecewise Linear Approximation

Figure 2A:
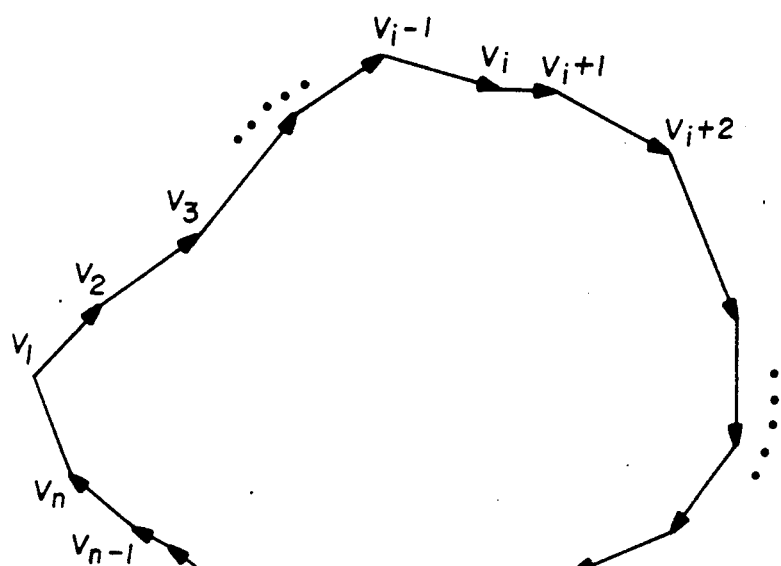
FIG. 2A illustrates graphically the linear approximation of a polygon which results in a number of short almost coincident vectors that are replaced by a single vector in their place.

The piecewise linear approximation process converts a sequence of contour pixels into a sequence of vectors by merging colinear pixels. The sequence of vectors forming a closed boundary becomes a polygon as shown in FIG. 2A The piecewise linear approximation process is modified somewhat by imposing an inner product constraint which allows for the detection of sharp corners during iteration. Sequentially scan the contour pixel and merge the consecutive pixels which lie on the same straight line into vectors. This forms a polygon which is composed of a sequence of short vectors as shown in FIG. 2A The vertices of a polygon are denoted by $(V_1, V_2, V_3 \ldots V_i \ldots V_n)$. Calculation of normalized inner product of any two consecutive vectors (e.g. $V_i$ and $V_{i+1}$) where $$I_i = \frac{\overrightarrow{v_{i-1} v_i} \cdot \overrightarrow{v_i v_{i+1}}}{\left|\overrightarrow{v_{i-1} v_i}\right| \left|\overrightarrow{v_i v_{i+1}}\right|}$$

and $$-1 \leq I_i \leq 1$$

By considering any three consecutive points $v_{i-1}, v_i, v_{i+1}$ and $v_{i-1}, v_{i+1}$ form the sides of a triangle $v_{i-1}, v_i, v_{i+1}$. The line segment $v_{i-1}, v_{i+1}$ is the base of $\Delta - v_{i-1}, v_i, v_{i+1}$. The height of $\Delta v_{i-1}, v_i, v_{i+1}$ serves as the deviation for approximating the series of $V_{i-1}, V_i$ and $v_i, v_{i+1}$, to $v_{i-1}, v_{i+1}$. If the deviation is smaller than a predetermined threshold ($\epsilon$) and $I_i$ is greater than a predetermined negative value the approximator described above is applied. Otherwise, the part $v_i$ is kept and the next two consecutive segments are exposed for linear approximation.

Figure 2B:
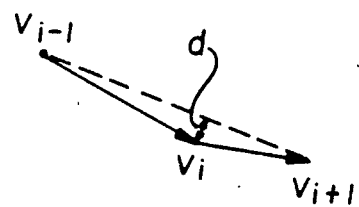
FIG. 2B illustrates graphically how the deviation from a substitute vector is determined.
Figure 3:
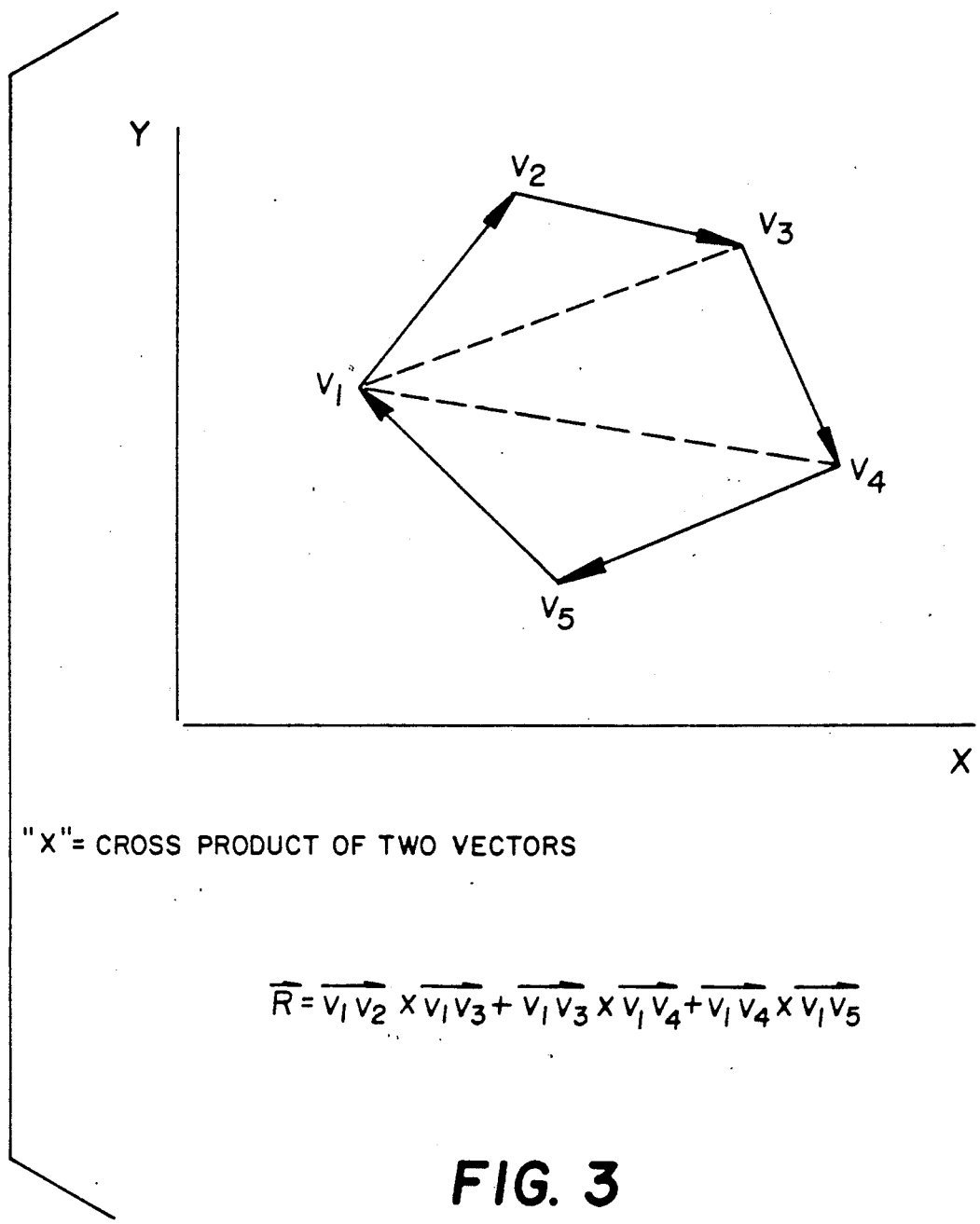
FIG. 3 illustrates how the parameter "R" is defined and calculated.

In FIG. 2b vectors $\overrightarrow{v_{i-1} v_i}$ and $\overrightarrow{v_i v_{i+1}}$ are shown if the values for d which is the deviation from a replacement vector $\overrightarrow{v_{i-1} v_{i+1}}$ is below a given value, the replacement will be made. However, in the event d is above a predetermined value, the original vector will be preserved. The value of d is given by:

$$d = \frac{x_i(x_{i+1} - y_{i-1}) - y_i(x_{i+1} - x_{i-1}) + (y_{i-1}x_{i+1} - x_{i-1}y_{i+1})}{\sqrt{(x_{i+1} - x_{i-1})^2 + (y_{i+1} - y_{i-1})^2}}$$

Accordingly, the sharp corner preservation is accomplished by evaluating normalized inner product values of each of two consecutive vectors during iteration and skipping over the segment merging operator when the value is smaller than a negative threshold. The negative threshold value is selected because the inner product of edge segments at a sharp corner must be a negative value. Thus, the smaller the normalized value the sharper the corner it indicates. For this particular application, the threshold is set a (−0.5) in radians. By incorporating this constraint in a piecewise linear approximation, it has been found that the process preserves sharp turning acute corners while smoothing out noisy short segments It should be noted that this capability is particularly critical when linear approximation is applied to line-like objects. It should be noted that during operation of the piecewise linear approximation algorithm, the smoothing threshold is started with one and incremented up to the predetermined value while iteration goes along in order to minimize the distorted results obtained in linear approximation.

When completed, the contour vectorization process converts a bit map image into a collection of simple polygons. The polygon representation allows for the graphics/text separation to be conducted in a more compact polygon domain requiring less memory.

Polygon-Based Feature Classification

The objective of the classification algorithm is to assign the collected polygons into one of two classes: graphics and text. The graphical polygons are then further classified into four subclasses: large graphic frames, thin lines, recognized small logos such as rectangular symbols and unrecognized symbols.

The textual polygons are classified into text strings based on their geometrical coordinates. Each string contains a sequence of segmented character contour polygons which are ready for an optical character recognition module to translate into computer understandable ASCII characters.

The algorithm emphasizes identifying and extracting graphical polygons out of a collection of unclassified polygons. The remaining polygons are then assigned as a class of text.

The algorithm is composed of seven major processing steps:
  Feature extraction of polygons
  First stage graphics extraction
  Adjacent polygons grouping
  Second stage graphics extraction
  Object string grouping
  Third stage graphics extraction
  Text string extraction Feature extraction of polygons is kept simple so that computation time can be minimized. Six polygon global features are selected for classifying graphics:
  #1 Polygon width
  #2 Polygon height
  #3 Area inside polygon
  #4 Orientation of directed line segments along polygon
  #5 Dimensional aspect ratio (width vs.
  #6 Area ratio of inside polygon versus rectangular bounding box of the polygon.

P represents an extracted polygon from a document, which is represented by a sequence of vertices, i.e. $P = (v_1, v_2, v_3, \ldots v_n)$, such that two adjacent vertices $v_i$ and $v_{i+1}$ define an edge (vector) of the polygon. Each vertex $v_i, 1 \leq i \leq n$, is represented by its x and y coordinates.

The six features mentioned above can be simply computed from the sequence of x and y coordinates of a polygon vertices. Features #1 through #3 are three primary features which are directly calculated from the coordinates and features #4 through #6 are derived features which are constructed from the primary features. The feature values are calculated as follows:

The size of a component (W:width; H:height)
1 $W = \max(x_i) - \min(x_i); i = 1, \ldots n$
2 $H = \max(y_i) - \min(y_i)$
The orientation of a contour R is given by:
3 $R = \sum_{i=2}^{n-2} [(x_i - x_1)(y_{i+1} - y_1) - (x_{i+1} - x_1)(y_i - y_1)]$.

If $R > 0$; the contour goes clockwise;
$R < 0$; the contour goes counterclockwise.

The area inside a polygon (A)
4 $A = \frac{1}{2}|R|$
5 The dimensional aspect ratio (H/W)
6 The ratio of contour area to boundary area (A/WH)

The previously mentioned feature values used in the first graphics extraction.

First Stage Graphics Extraction

Contour vectorization applied to a document produces a collection of uncorrelated polygons with widely varying sizes. The presence of large polygons indicates large graphical contours existing in the document. It is desirable to extract large graphics in order to restrict processing of other contours that are more likely candidates for being members of text strings or smaller graphic components. Not only does such a practice improve accuracy, but also reduces processing time.

Figure 4:
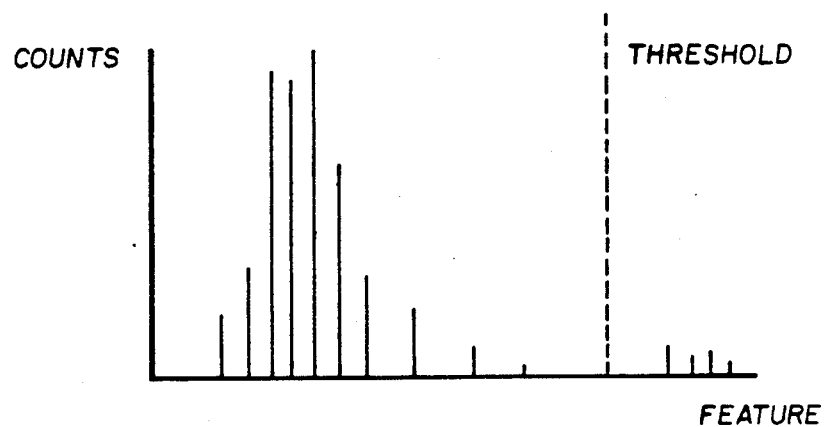
FIG. 4 illustrates a feature histogram and the feature break.

Next, three histograms of the relative frequency of occurrence of polygons as a function of features #1, #2 and #3, is used to establish three thresholds (th1, th2, th3) which is then used to broadly separate the large graphics polygons from what may constitute text or small graphic polygons within the working set. The threshold selection must insure that the threshold lies outside that part of the histogram that represents the set of text characters. Observation of experiments using form images revealed that very low population region (white gap) as shown in FIG. 4. It has been determined that use of this white gap can be used to establish a threshold to filter out large graphics polygons. Experiments have shown that a value of 200 for th1 and th2 is an appropriate level for a form image digitized with a 400 dpi scanner.

After the extraction of graphical contours (inner and outer contours for a polygon) and long thin lines, only text contours, small graphical contours and small inner contours of a large graphics remain in the remaining set of polygons.

In order to facilitate the extraction of remaining graphical components and speed up object reconstruction in later processing, the remaining polygons are classified into two groups: outer contour group where $R > 0$ and inner contour group where $R < 0$. The positive R denotes a clockwise contour and the counter clockwise contour is indicated by a negative (R).

Adjacent Polygon Grouping

The contour vectorization of the document results in a group of random uncorrelated polygons. The process of segmenting both the outer and inner polygon contours into more geometrically correlated groups will then allow the linking process to be performed on those contours for object reconstruction and can be conducted in geometrical subgroups after first stage graphics extraction.

Figure 5B:
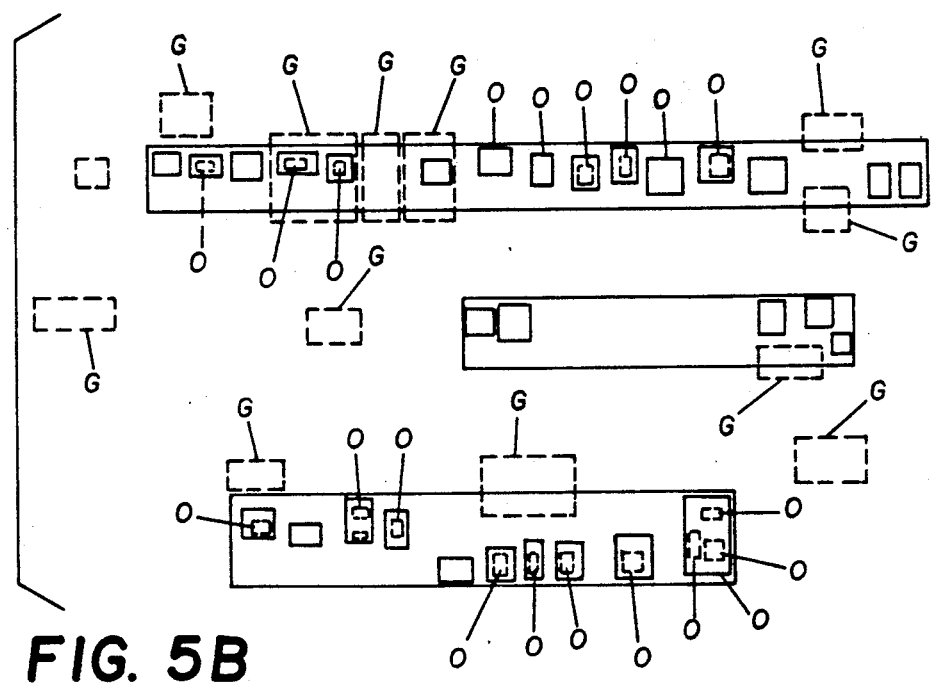
FIG. 5B illustrates a block segmentation diagram used for extracting small inner contours of large graphics.
Figure 5A:
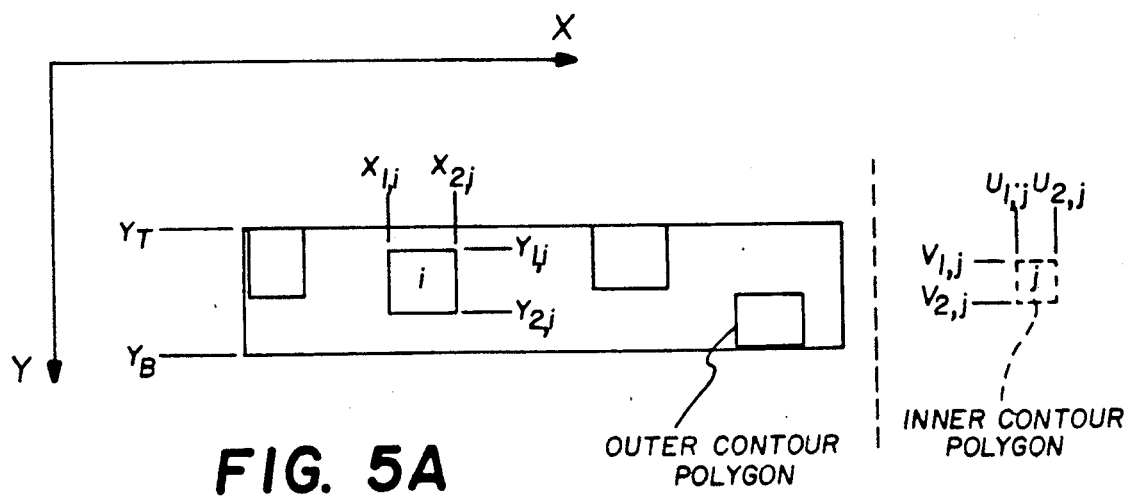
FIG. 5A illustrates the coordinate system used in conjunction with block segmentation and determined natural gaps.

The grouping is made by first sorting polygon components to put them in a geometrical top to bottom order list based on location. An indirect Quicksort scheme which is in the public domain is used for component sorting where the Y value of the corner coordinate of the polygon bounding box is taken as the sorting key value. Next, the sorted components are scanned in order to detect segmentation points. A segmentation point is found when the upper coordinate ($Y_{1,(i+1)}$) subtracts the lower coordinate ($Y_{2,i}$) results in a positive value (FIG. 5A). Where the subscripts i and i+1 indicate the two consecutive components in the sorted list; the subscripts 1 and 2 are the upper and lower location (left and right location) of a bounding box of a polygon. A positive value implies a physical white gap (nonoverlap) in a horizontal projection between consecutive polygons in the sorted list. Thus, when a white space is detected, a new block segment is found. A graphical example of the block segmentation is shown in FIG. 5A. The polygons assigned to the same segmentation block tend to have close geometrical links in the horizontal direction.

Second Stage Graphics Extraction

This process examines geometrical relationships of the coordinates of outer and inner contours of polygons to see whether they belong to boundaries of the same object entity. The intent of the processing is to link the inner contour of polygons with their associated outer contour of a polygon to facilitate post recognition processing and object reconstruction. Also, use of the linking process may identify some graphical polygons missed in the first stage graphics extraction.

The link process is done on a block-by-block basis. The basic linking rule is examining whether an inner contour of a polygon geometrically lies inside the outer contour of a polygon. When a link is found, the inner polygon is then detected from its block list and assigned to its associated outer polygon contour. The linking process proceeds through every inner and outer contour of a polygon. Any inner contour which cannot link with an outer contour of a polygon is assigned to a graphics class such as those dotted boxes labeled G (polygon bounding boxes of inner contours) which are not circumscribed by any solid bounding boxes as shown in FIG. 5B. This can occur when the size of an inner contour of a large frame is smaller than the threshold assigned in the first stage of graphics extractions.

In FIG. 5A, the solid boxes indicate the bounding boxes of the outer contour of a polygon and the dotted boxes are the bounding boxes of inner contour of the polygons.

Object String Grouping

At the end of the linking process, the polygon list in each outer contour polygon block represents an ordered list of character contours mixed with small graphics contours. It is desirable to break a long polygon string into several short and meaningful polygon strings such as sentences. This is achieved by sorting polygon components into a left to right order list and then examining the distance between adjacent consecutive polygons. When a gap is greater than a predetermined threshold, a break point is set. The resulting short polygon strings provide more contextual information which helps in the final step of classification which is the extraction of small graphics embedded in the text string.

Third Stage Graphics Extraction

The entire performed process extracted the majority of the graphic components out of the total collection of polygons. The remaining unidentified graphics are either small text or text-like symbols such as small rectangular-like symbols embedded within the text string. Because the remaining symbols are predominantly rectangles and squares, the extraction of them is done by scanning outer contours of polygon strings and examining the area ratio of the inside polygon versus the rectangular bounding box of the polygon; for those polygons which have only one associated inner contour. Accordingly, if the area ratio of both inner and outer contours of the polygon are close to unity, then the polygon component is classified as graphic (rectangle or square). Another graphic extraction criteria is any outer contour that contains more than two inner contours because it cannot be text with that many inner contours.

It should be noted that as each component is extracted, a blank or space is left on the list of polygons. The location of these blank spaces naturally become a text string segmentation (or break) point. The segmentation points indicate the first component of a new text string.

Figure 6:
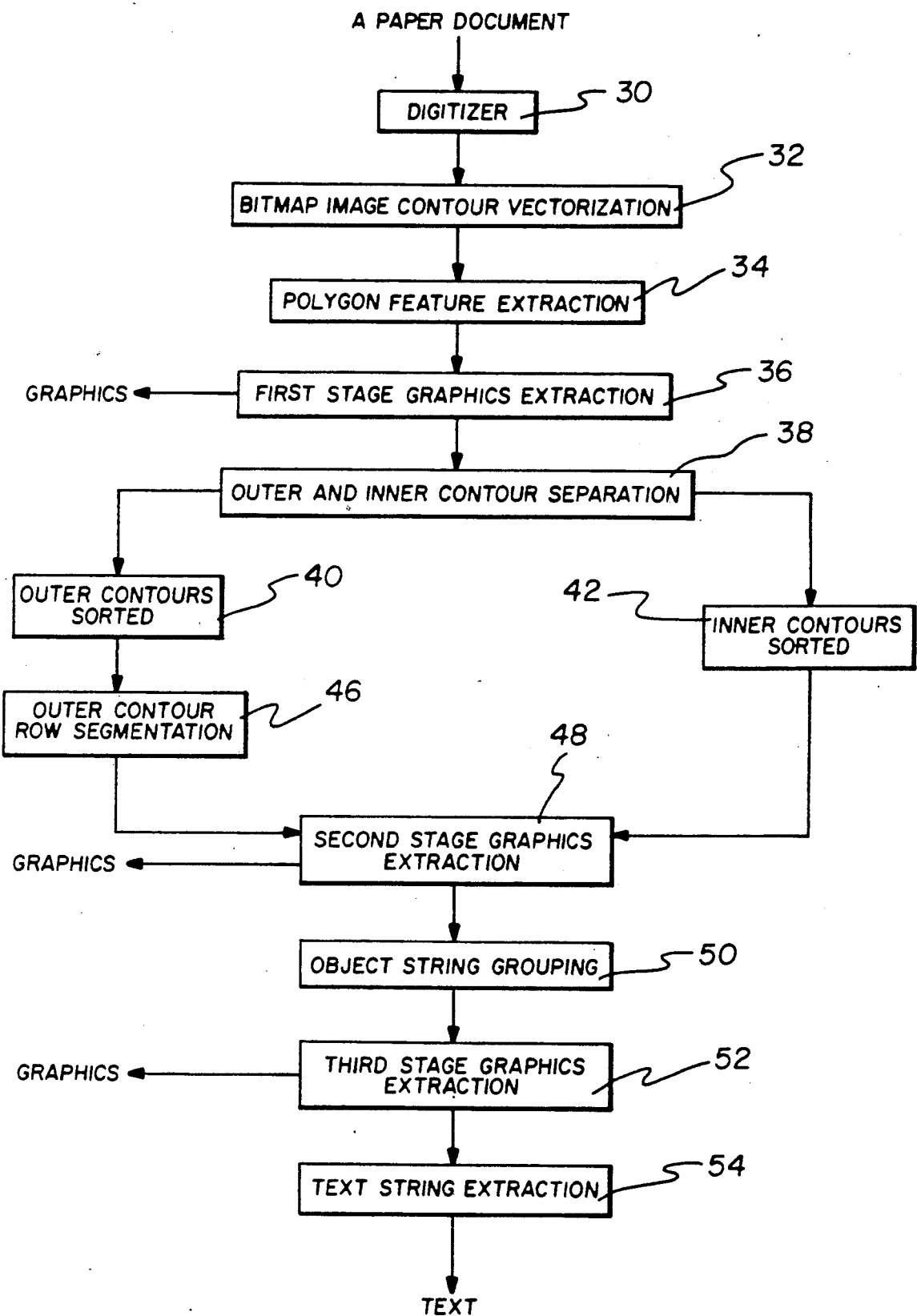
FIG. 6 illustrates a high level function chart.
Figure 7A:
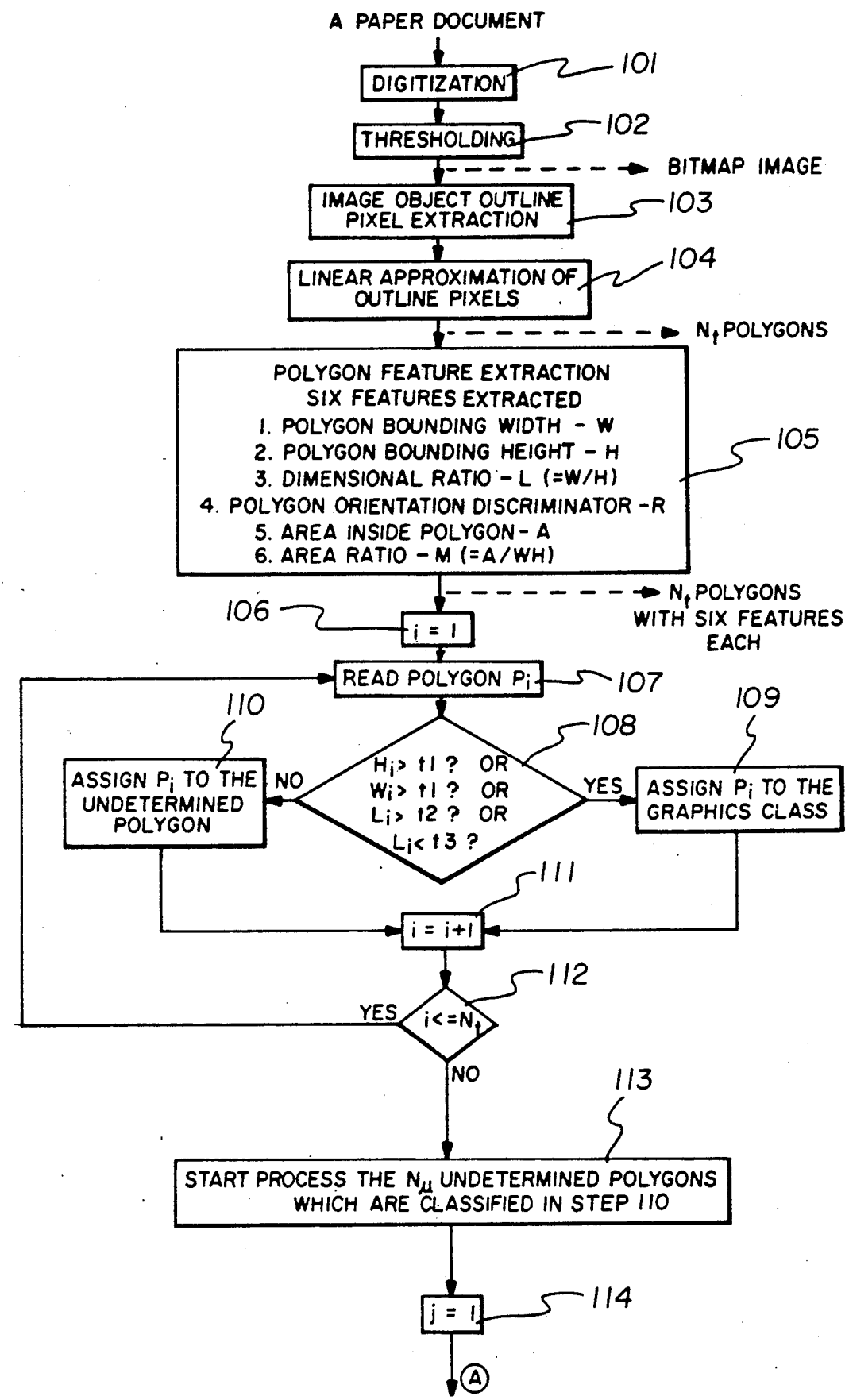
FIGS. 7A-E illustrate a flow chart for the classification of text and graphics components from digitized paper-based forms.
Figure 7B:
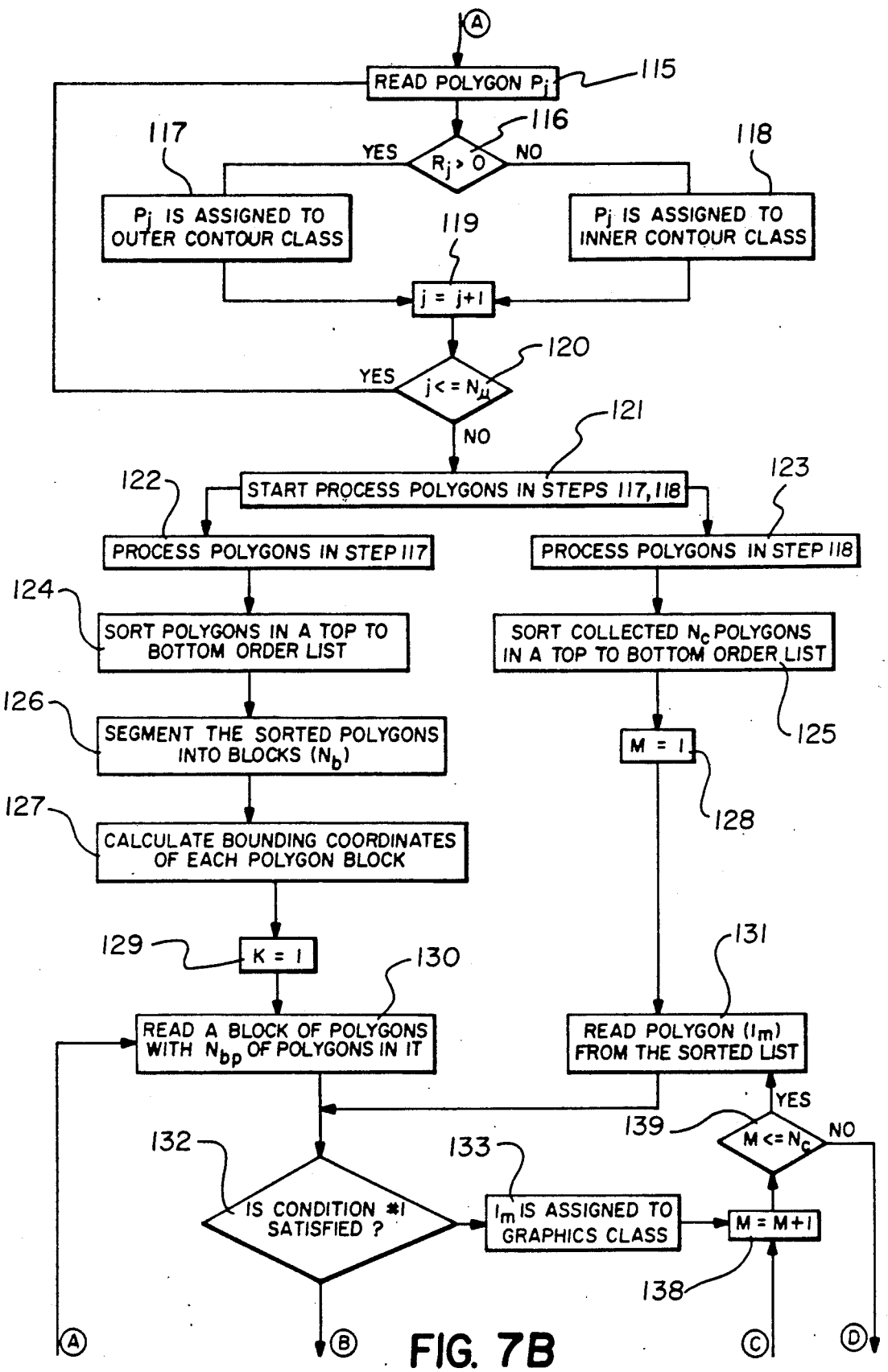
Figure 7C:
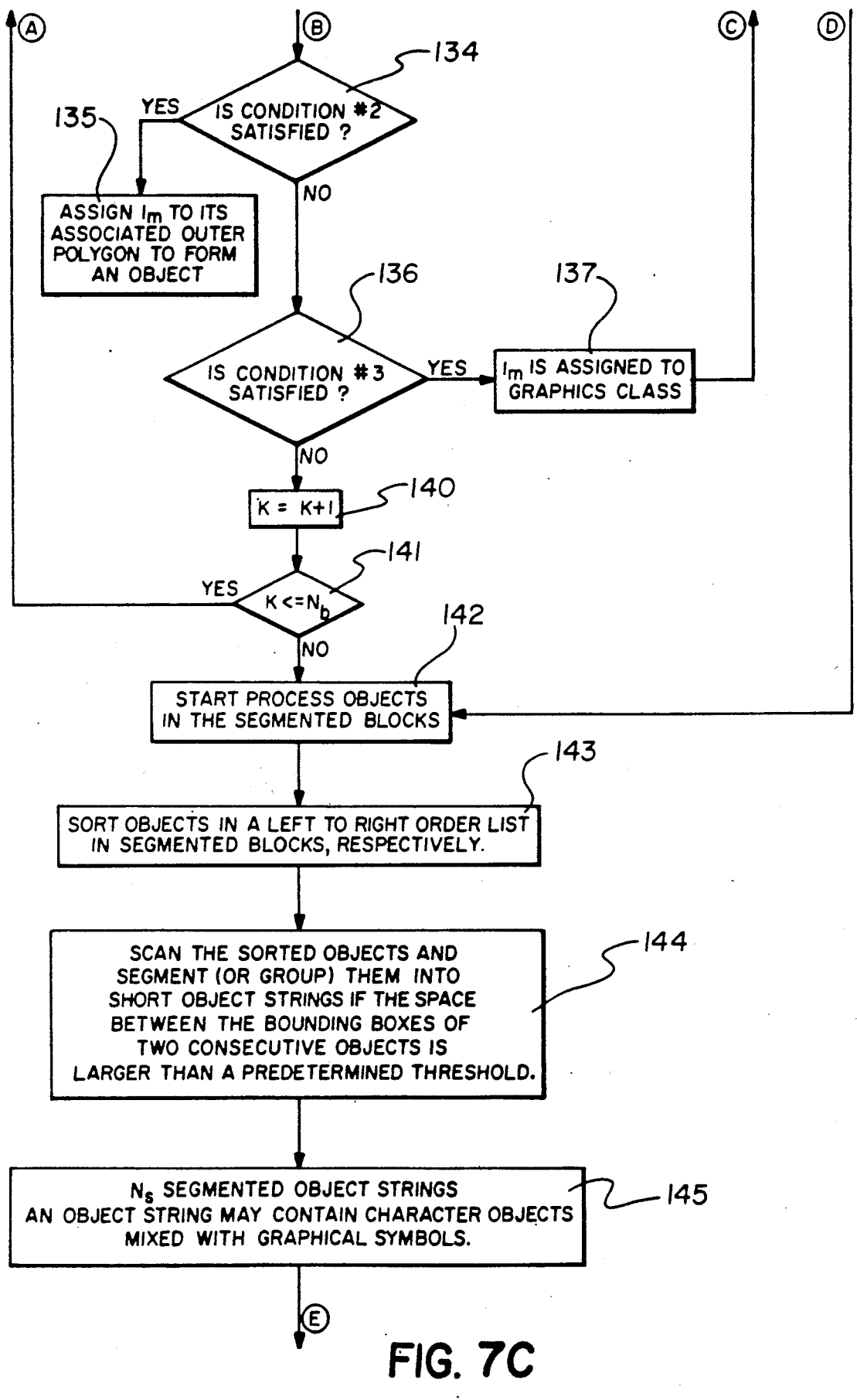
Figure 7D:
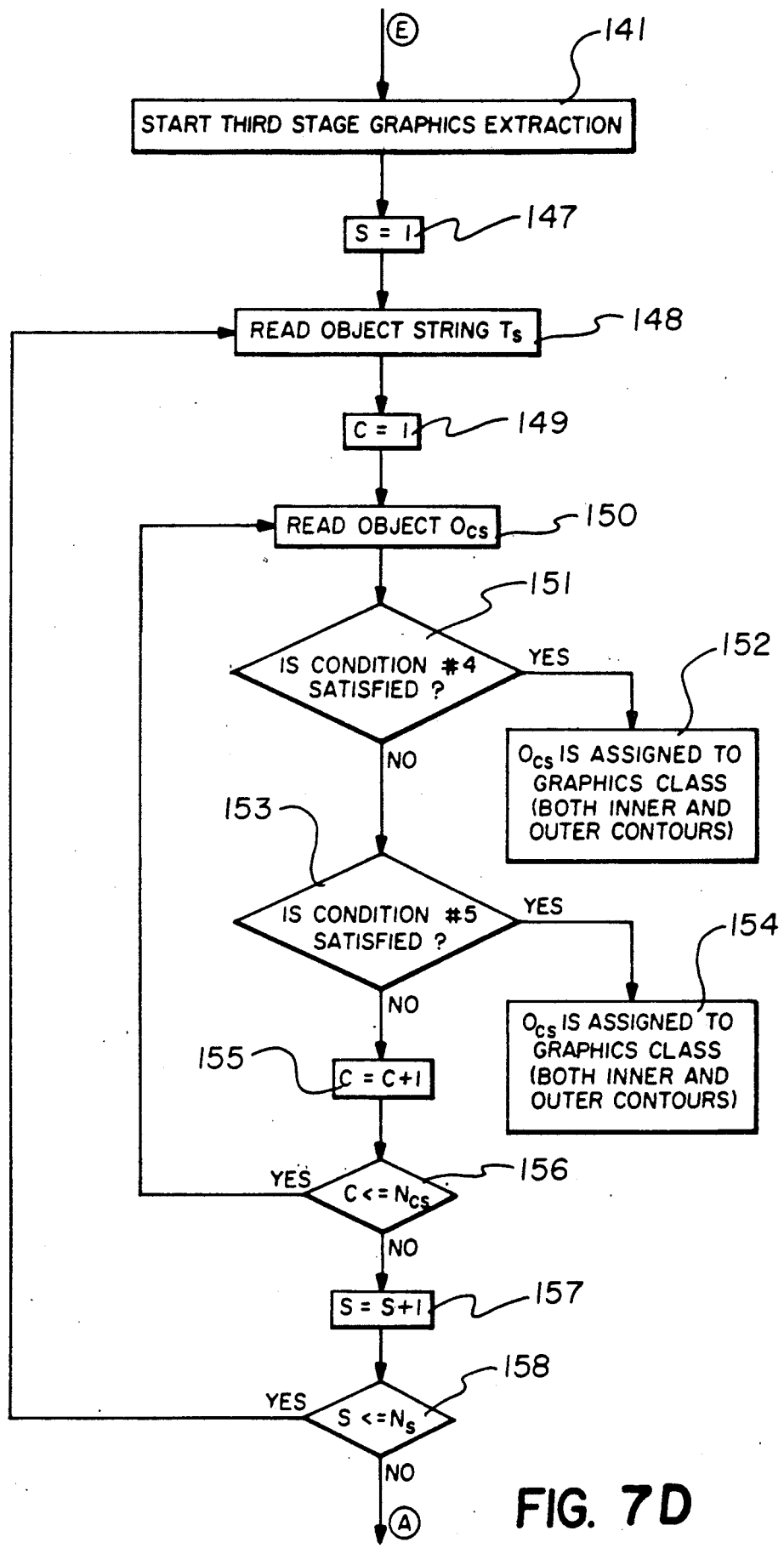
Figure 7E:
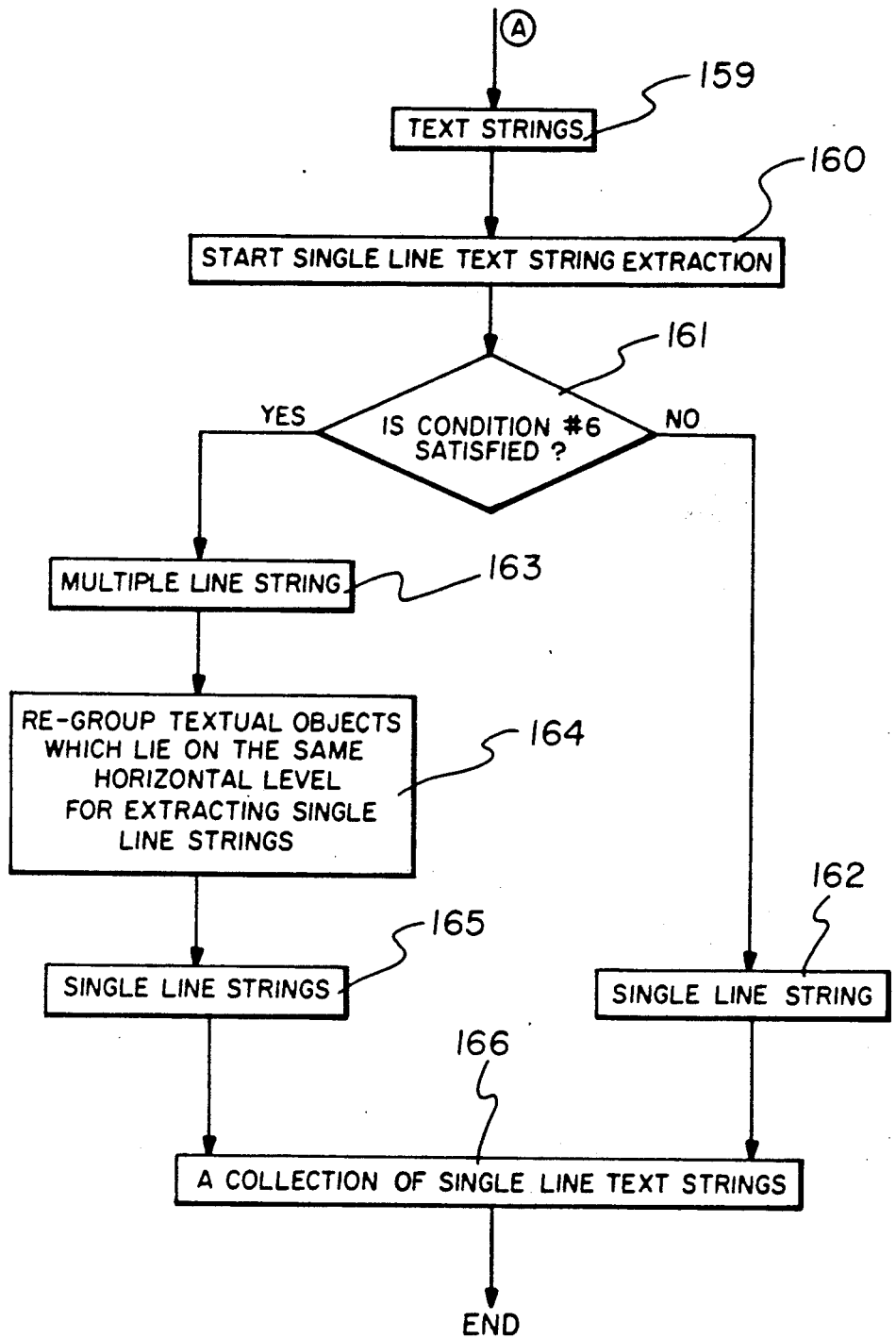
Figure 8C:
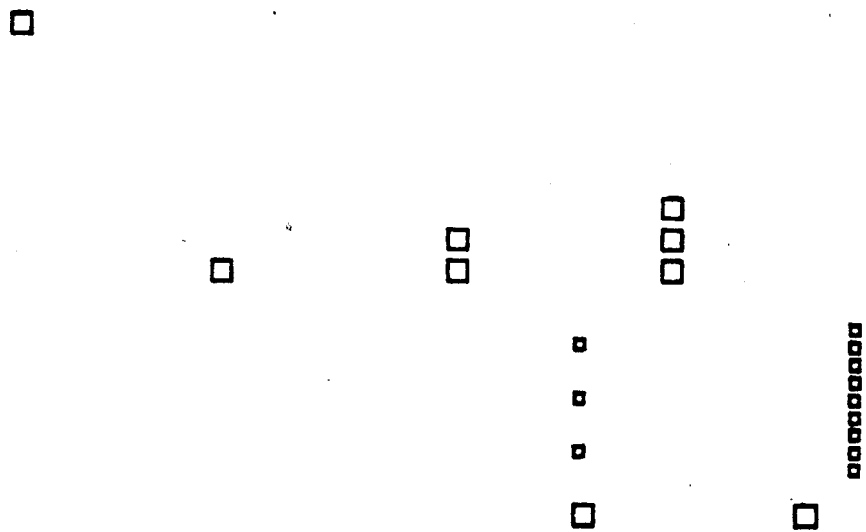
FIG. 8C illustrates the extruded graphic symbols from FIG. 8B.
Figure 8D:
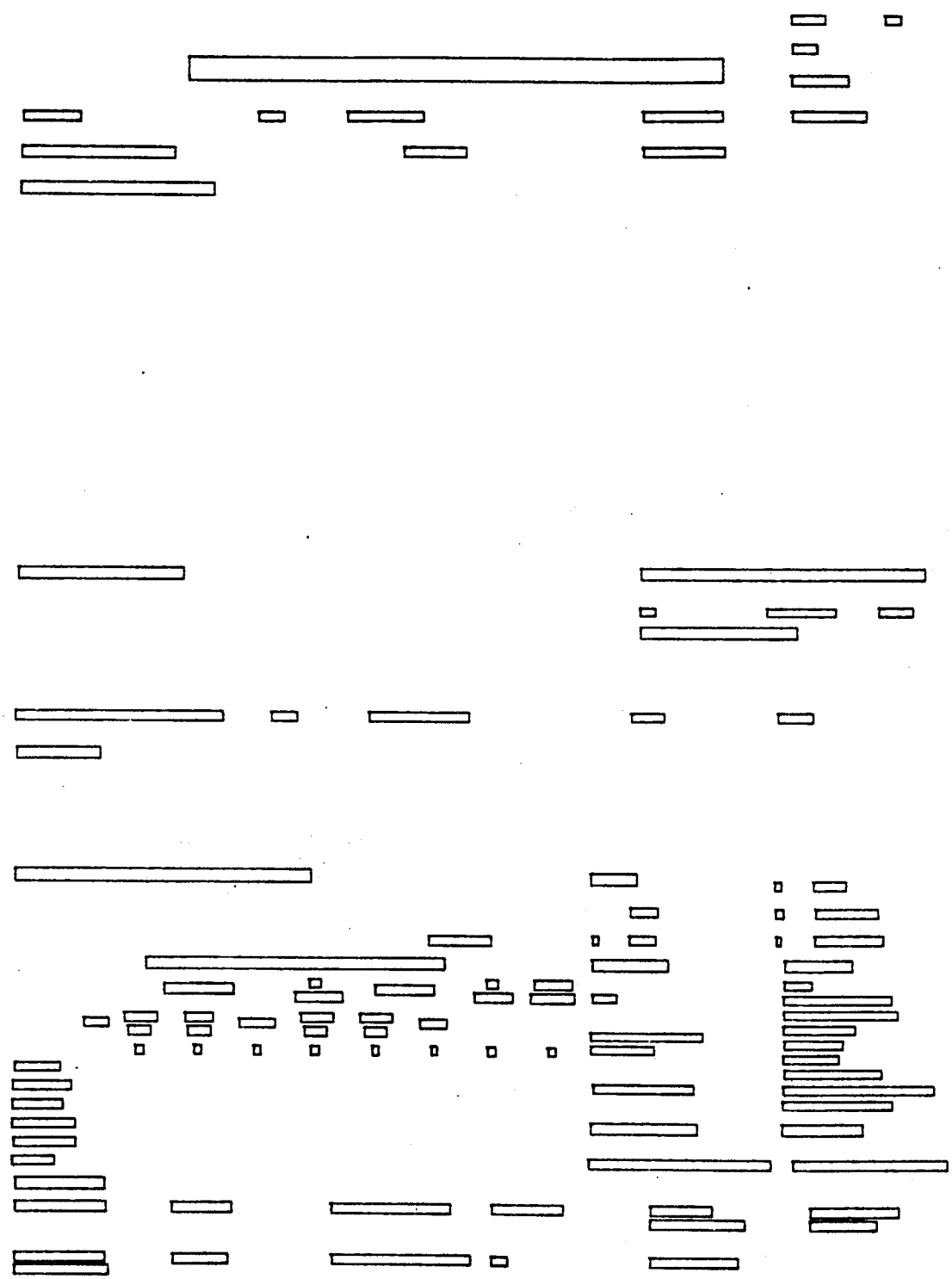
FIG. 8D illustrates the text string locations from FIG. 8B.
Figure 8E:
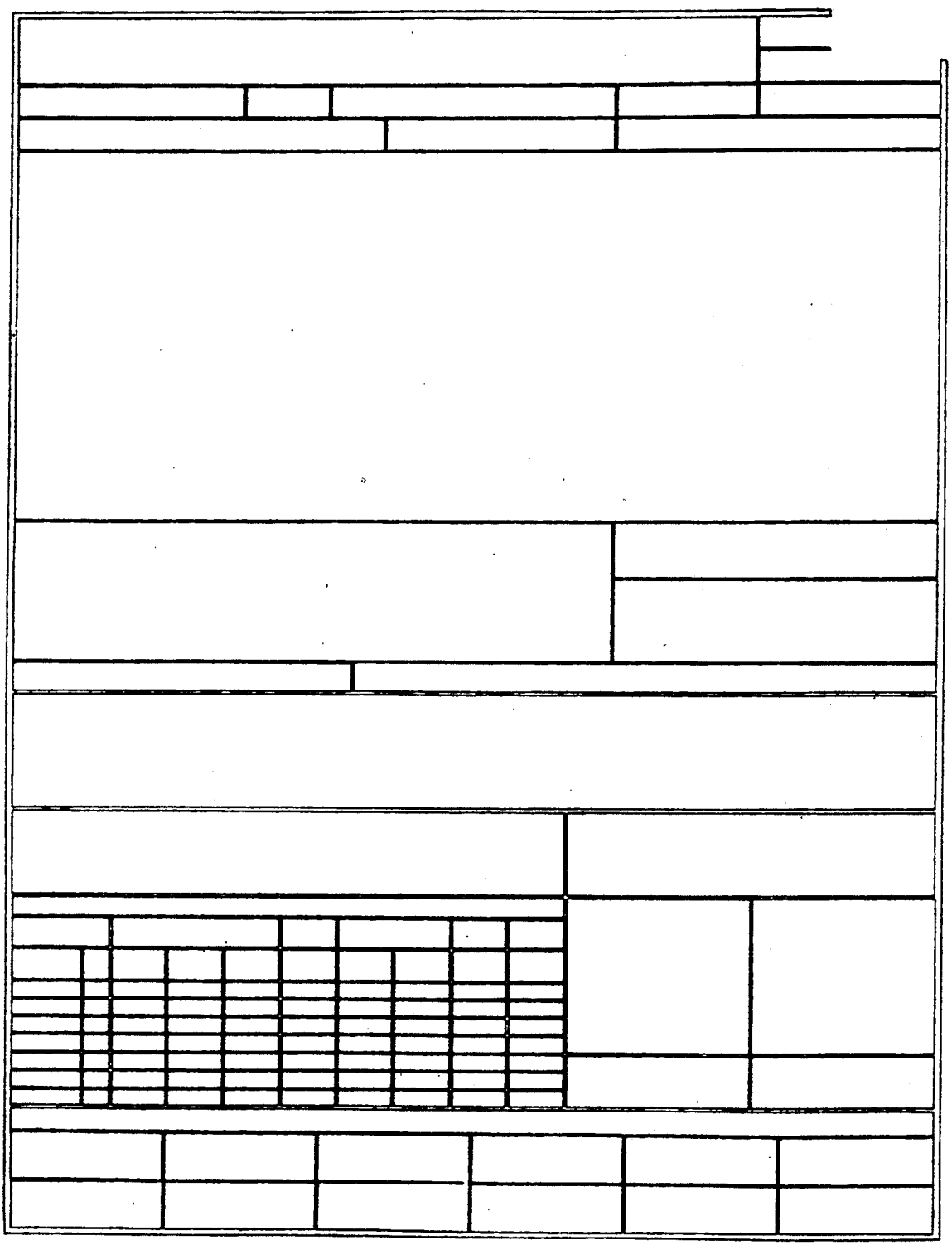
FIG. 8E illustrates the extracted large graphical contours represented by polygons from FIG. 8B.

To summarize the preceding steps in a functional manner as shown in FIG. 6, a marked paper document is digitized using a scanner in step 30. This digitization converts a paper document into a digital image. The digital image is represented by a two dimensional array of cells. The value in each cell is either "1" or "0". A black dot is indicated by "1" and a white dot by "0". This digitized image is called a bitmap (binary) image. In step 32, contour vectorization is used to extract the outline of any black patterns and the extracted outlines are represented by polygons. Contour vectorization is made up of two processes; contour pixel tracing and linear approximation of contour pixels. The vectorization process produces a collection of simple polygons.

In step 34, six features are extracted from each polygon to enable graphics extraction. In this first stage of graphics extraction shown in step 36, large graphics as well as thin lines are extracted by using dimensional thresholding. In step 38, polygons are separated into two groups based on the rotational orientation of sequential vectors of the polygon with the orientation being indicated by the value "R".

Step 38 separates polygons into inner and outer contours as in step 42 and 40, respectively. Block segmentation is then used to group the adjacent polygons into blocks as per step 46. Sorting of the polygons occurs based on their spatial coordinates and are then placed in order based on a geometrical top to bottom list based on their location. A segmentation point is formed when a physical white space is detected in a horizontal projection between two consecutive polygons.

In step 48, the second stage graphic is extracted. A collection of small inner contours are assigned into either graphics or inner contours of an undetermined outer contour.

The linking of inner contours and outer contours can be used to form a complete description of an object. The horizontal spacing between two adjacent polygons for logical grouping of outer polygons is used. The result of such a grouping results in a collection of polygon strings which is in accordance with step 50.

In step 52, the third stage of graphic extraction takes place. This process assigned the matching objects into either graphics or text. If conditions #5 and #6 are satisfied, the object is assigned as a graphic. Otherwise, the object is treated as text. Condition #5 requires that an object contain only one inner contour and one outer contour and that the area ratios (polygon area/polygon bounding box area) of both outer and inner contours are greater than a threshold of approximately 0.9. Condition #6 requires that the height of the text string box be greater than two times the average height of individual objects.

In step 54, text string extraction occurs. The relative height between the boundary box of the polygon string is examined along with the average height of polygons. If condition #6 is satisfied, it indicates that more than two strings are contained in a polygon string. Then, by using the center coordinates of the polygons lying on the same horizontal level, is grouped and treated as a new text string.

Flow Chart

FIGS. 7A-E illustrate a flow chart for the present algorithm where step 101 requires that a paper document be scanned and digitized for the conversion of a paper-based image into a digital image. In step 102, a thresholding operation is applied to each pixel of the digitized image to produce a binary (bitmap) image. Contour vectorization is performed in the next two steps 103 and 104. An object contour following operation is used to extract edge pixels of objects (i.e. outlines of objects) in the bitmap image. In step 104, a linear approximation operation is applied for merging colinear outline pixels into straight segments. This results in a collection of polygons represented by an outline of an object which can have both an inner or outer contour.

In step 105, six polygon features are extracted and these are based on geometric parameters of the polygons. Step 106 begins the first stage of graphics extraction and "i" is set to one for reading the first element in the collected polygons. The ith polygon ($P_i$) is read in step 107. If one of the conditions in step 108 is satisfied, then the polygon ($P_i$) is classified as a graphic in step 109. If the polygon does satisfy any of the conditions in step 108 then it is classified as unknown status in step 110, and the index "i" is incremented in step 111 for reading the next polygon. Step 112 requires that the steps 107-111 are repeated for the next polygon until the last polygon has been read. Step 113 requires that all the polygons classified as having an unknown status in step 110 are to be processed further by accessing the first polygon by setting index "j" to one in step 114. The jth polygon ($P_j$) is read in step 115 to examine the polygon feature $R_j$ in step 116. If $R_j$ is greater than zero, the polygon ($P_j$) is assigned to the inner contour class in step 118. Next, "j" is incremented to read the next polygon contour in step 119. The counter in step 120 is decremented for each polygon causing the step 114-119 to be repeated until all the polygons have been read.

In step 121, the processing of the polygons classified as outer contours in step 117 and the inner contours in step 118 separately with the outer contours of step 117 beginning processing in step 122 and the inner contours being processed in step 123. Steps 124 and 125 sort the respective groups of polygons in a top to bottom list. The outer contours segmented into blocks in step 126 for ease of second stage graphic extraction. In step 127, bounding coordinates are calculated of the segmented polygon blocks. Step 128 allows for the accessing of the first contour in the sorted list from step 123 by setting "m" to one. In a similar fashion, step 129 allows access to the first inner contour in step 126 by setting "k" to one.

Step 130 starts the second stage graphics extraction by reading the kth block contour and its associated bounding coordinates. Similarly, step 131 results in the reading of the mth polygon of the inner contour class from the sorted list (FIGS. 5A and B). In step 132, if the condition #1 is met, then the polygon ($I_m$) in the inner contour class is assigned as a graphic. Where condition #1:

$$\begin{cases} [V_{2j} \leq Y_T] \\ [(V_{ij} \leq Y_T) \text{ and } (Y_T \leq V_{2j})] \\ [(Y_B \leq V_{2j}) \text{ and } (V_{ij} \leq Y_B)] \end{cases}$$

If condition #1 is not met, condition #2 is next examined. If condition #2 is met, then the $I_m$ polygon is attached to its associated polygon in the outer contour class. Where condition #2 is:

$$\begin{matrix} \text{condition } \#2 \\ \text{and} \end{matrix} \begin{cases} (U_{1j} \geq X_{1i}) \text{ AND } (X_{2i} \geq U_{2j}) \\ (V_{1j} \geq y_{1i}) \text{ AND } (y_{2i} \geq V_{2j}) \end{cases}$$

This forms a complete object which may contain outer as well as inner contours (outlines). If condition #2 is not met, then condition #3 is examined next in step 136. If condition #3 is satisfied, then the $I_m$ polygon is assigned as a graphic in step 137. Step 138 requires the reading of the next polygon from the inner contour class. Step 139 directs to step 142 after the last polygon is read. Where condition #3 is:

Condition #3 $V_{2j} < Y_B$

If condition #3 is not met, then move to step 140 which requires the reading of the next block of polygons by incrementing index k. Step 141

30 requires that steps 130-140 be repeated until the last block of polygons is read. Up to this point, all of the polygons in step 118 have been either assigned as a graphic or attached to their associated polygon (outer contour) in step 117 and form a list of object blocks (polygon inner contours). An object is represented by the inner contour of the polygon (outlines).

In step 142, processing of the objects begins in order to extract graphical objects and text strings. Step 143 sorts objects in a left to right order list in the object blocks, respectively. Step 144 splits or separates the objects strings left to right order list in the object blocks respectively, so that object strings are obtained in step 145, the object element in each string can be either a character or a symbol.

Step 146 starts the last stage of graphic extraction. The following steps are designed to extract symbols from object lists so that the remaining objects are then classified as text. Step 147 sets the object string index "S" to one to begin object reading. Step 148 processes the Sth object string ($T_s$) with step 149 accessing the first element in the string ($O_{cs}$). Step 150 requires that the object ($O_{cs}$) be read and then is condition #4 in step 151 is satisfied, the object is assigned to a graphic class in accordance with step 152. Condition #4 is as follows:

condition #4—An object contains more than two inner contours

If contour #4 is not met, it moves to step 152 to see if condition #5 can be met. Condition #5 is as follows:

condition #5—An object contains only one inner contour and one outer contour area ratios (polygons area/polygon bounding box area) of both outer and inner contours are greater than a threshold If condition #5 is satisfied, then the object is assigned to graphic class according to step 154. If condition #5 is not met, go on to step 155 and step 156 requires repeated object reading until the last object in the Sth string has been read. Step 157 begins processing the next block of objects by incrementing the block index "S" in step 158. The steps 148-157 are repeated until the last object in the last block is read.

In step 159, the remaining objects are classified as text. The above processes automatically result in a collection of text string blocks. In each string block, there may be multiple line text strings.

Step 160 begins the single line text extraction. If the condition #6 in step 161 is not satisfied, it confirms that the block only contains a single line string in accordance with step 162.

Condition #6 is as follows:

condition #6—the height of text string box is greater than two times the average height of individual objects.

If condition #6 is satisfied, it confirms that a multiple line string is found in accordance with step 163. Step 164 requires the re-grouping in the block to produce a single line text string as set forth in step 165. Step 166, the final step, results in a collection of text string bounding coordinates. Each string contains a list of characters and each character is represented by its outline polygon.

Advantages and Industrial Applicability

The present invention is useful in computer based systems that provide automated analysis and interpretation of paper-based documents such as forms. The present invention has advantages over previously applied bit map techniques in classification accuracy, robustness, efficiency of data structure, storage for post symbol recognition, line structure extraction and document analysis. Accordingly, the present invention is more appropriate in forms design and layout as well as in automated document analysis systems.

What is claimed is:

1. A method of classifying components of an image into text or graphics comprising the steps of:
   a) digitizing the image to form a bit map representation of the image;
   b) extracting a set of contour vectors from the bit map image; and
   c) extracting from the set of contour vectors a set of polygon features;
   d) employing the set of polygon features to classify a first set of graphics components;
   e) separating the image contour vectors into inner and outer contours;
   f) sorting all of the inner and outer contours according to horizontal location in their respective group;
   g) employing the inner and outer contours and the row segregation to classify a second set of graphic components;
   h) employing the polygon features and row segmentation to detect space between polygons in a horizontal projection between two consecutive polygons to identify a group of object strings;
   i) extracting from the group of textual strings a third set of graphic components in the form of single like text strings.

2. A method for the automatic classification of text and graphics components on a paper document comprising the steps of:
   a) scanning the image to produce a bit map digital image;
   b) generating from the bit map image a set of contour vectors;
   c) extracting from the set of contour vectors a set of polygon features;
   d) employing the set of polygon features to classify a first set of graphics components;
   e) separating the image contour vectors into inner and outer contours;
   f) sorting all of the inner and outer contours according to horizontal location in their respective groups;
   g) employing the inner and outer contours and the row segregation to classify a second set of graphic components;
   h) employing the polygon features and row segmentation to detect space between polygons in a horizontal projection between two consecutive polygons to identify a group of object strings;
   i) extracting from the group of object strings a third set of graphic components;
   j) classifying the remaining objects in the object string as text; and
   k) extracting from the group of object strings a third set of graphic components in the form of single line text strings.

3. A method for the automatic classification of text and graphics components on a paper document comprising the steps of:
   a) raster scanning said document;
   b) generating as the document is being scanned, a bit map representation of the document such that wherever a transition is detected contour vectorization is used to convert the bit representation into a collection of closed polygons formed by a series of vectors;
   c) calculating a plurality of features associated with the geometric parameters of the polygon;
   d) establishing a first threshold level to be applied to the collection of polygons such that the calculated value for that polygon is above said first threshold identifying the polygon as a large graphic;
   e) sorting the collection of polygons into inner and outer contours;
   f) sorting all of the inner and outer contours according to horizontal location in their respective groups;
   g) establishing polygon links for all polygons having a geometrical relationship in the horizontal direction;
   h) use contour linking to examine the geometrical relationship of the coordinates of both the outer and inner contours of a polygon to determine if they are geometrically overlapping;
   i) separate inner contour of polygons into either graphics or text after comparing the features of the polygon to a predetermined threshold; and
   j) comparing a subset of features of the remaining polygons which lie on the same horizontal level with predetermined threshold and remove single line text strings.

* * * * *

UNITED STATES PATENT AND TRADEMARK OFFICE
CERTIFICATE OF CORRECTION

PATENT NO. : 5,050,222
DATED : September 17, 1991
INVENTOR(S) : Yongchun Lee

It is certified that error appears in the above-indentified patent and that said Letters Patent is hereby corrected as shown below:

Column 5, line 55, insert "height)" after "vs.";

Column 10, line 43, delete "30";

Column 10, line 64, should read "... step 149 ... string $(T_S)$.", not "... step 149 ... string $(O_{cs})$."

Signed and Sealed this

Ninth Day of November, 1993

*Attest:*

BRUCE LEHMAN

*Attesting Officer*     *Commissioner of Patents and Trademarks*